United States Patent [19]

Larson

[11] 4,387,589
[45] Jun. 14, 1983

[54] TEST STAND
[75] Inventor: Larry A. Larson, Washington, Ill.
[73] Assignee: Caterpillar Tractor Co., Peoria, Ill.
[21] Appl. No.: 287,538
[22] PCT Filed: Jun. 10, 1981
[86] PCT No.: PCT/US81/00780
§ 371 Date: Jun. 10, 1981
§ 102(e) Date: Jun. 10, 1981
[87] PCT Pub. No.: WO82/04481
PCT Pub. Date: Dec. 23, 1982
[51] Int. Cl.³ ............................................. G01M 15/00
[52] U.S. Cl. ..................................... 73/119 A; 73/168
[58] Field of Search ............... 73/65, 117, 119 A, 660, 73/168

[56] References Cited
U.S. PATENT DOCUMENTS

| 854,720 | 5/1907 | Dawson . | |
|---|---|---|---|
| 1,961,426 | 6/1934 | Morgan | 192/67 |
| 3,301,359 | 6/1965 | Cole et al. | 192/4 |
| 3,412,579 | 11/1968 | Hainz | 73/119 A X |
| 3,545,071 | 3/1968 | Loyd et al. | 29/470.3 |
| 3,599,857 | 8/1971 | Loyd | 228/2 |
| 3,690,165 | 9/1972 | Sturmo et al. | 73/117 |
| 3,694,896 | 10/1972 | Loyd | 39/470.3 |
| 3,775,997 | 12/1973 | Carman | 64/9 |
| 3,791,498 | 2/1974 | Wassermann | 192/57 |
| 4,109,519 | 8/1978 | Bartlett et al. | 73/135 |

OTHER PUBLICATIONS

Bacharach Instrument Company, Pittsburgh, PA, "Professional Series Diesel Fuel Pump Calibration Stand", 9/77 (Bulletin 1054-R).
Bacharach Instrument Company, Pittsburgh, PA, "Specialist Series Diesel Fuel Pump Calibration Stand", 9/77 (Bulletin 1074R).
Bacharach Instrument Company, Pittsburgh PA, "Calibration Stand Accessories for Caterpillar Pumps" 2/76 (New Prod. Bulletin).
Bacharach Instrument Company, Pittsburgh, PA, "Accessories for Caterpillar 3406 Pumps", 2/76 (Tech Bulletin, vol. D-26).

Primary Examiner—Jerry W. Myracle
Attorney, Agent, or Firm—Anthony N. Woloch

[57] ABSTRACT

A test stand (10) having a principal use for testing a fuel pump and associated governor (24), has a drive shaft (16), an inertial weight (30) operatively associated therewith, and apparatus (56) for selectively engaging and disengaging the inertial weight (30) with the drive shaft (16). This test stand (10) solves the technical problems associated with present test stands, which problems include the inability to maintain a constant drive shaft speed for fuel pump calibration, and also the inability to thereafter rapidly increase or decrease said drive shaft speed for purposes of determining the governor response. The apparatus (56) can accommodate misalignment between the drive shaft (16) and the fuel pump (24). The test stand can also include a spline arrangement (108) which also accommodates misalignment between the drive shaft (16) and a cam shaft (99) of the fuel pump (24).

8 Claims, 4 Drawing Figures

TEST STAND

DESCRIPTION

1. Technical Field

The present invention is related to test stands which have means for driving a drive shaft to drive a mechanism to be tested and calibrated and, in particular, to test stands for calibrating injection fuel pumps and governors associated therewith.

2. Background Art

Present test stands for testing injection fuel pump and governor arrangements and the like include a motor which drives a drive shaft and instrumentation for determining the rotational speed of the shaft. Apparatus is also provided for connecting the fuel injection pump to be tested with the drive shaft.

Present test stands are unable to maintain a constant drive shaft speed during the testing of the fuel injection pumps. The reason for this is inherent in the operation of the injection fuel pump itself. During a 360° revolution of the fuel injection pump's cam shaft, the pump can, for example, inject six metered amounts of fuel into the appropriate cylinders of a six cylinder diesel engine. Each injection cycle takes up 60° of the entire revolution of the shaft. Of these 60°, 12° may be used to inject the fuel, which injection places a substantial jerk type load on the motor driving the test stand, and the remaining 48° may be a no-load, coast condition. In some situations, it is possible for the speed of the drive shaft to drop up to 70 or 80 rpm during the load conditions and then return to the test speed, which can be, for example, in the range of from 700 rpm to 1,300 rpm, during no-load conditions. Thus, it can be seen that test results and calibrations are adversely affected by the inability of the present test stands to maintain a constant speed throughout the testing of the fuel injection pumps due to the intermittent jerk loads applied to the test stand.

Some prior art test stands have attempted to solve the problem of constant speed testing of the fuel pumps by providing a drive shaft which has substantial flywheel mass associated therewith to help stabilize the drive shaft for constant speed, fuel injection pump testing. However, the additional mass is a hindrance when the drive shaft must be instantaneously accelerated in order to test the reaction time of the governor associated with the fuel pump. Generally, with such an arrangement, in order to rapidly overcome the inertia associated with the drive shaft, the motor must deliver and the drive members transmit large forcing torques. If, on the other hand, nominal motor driving torque is applied to the high mass drive shaft, relatively slow speed changes will occur. The speed change from the lower to the higher final speed will be too slow to properly test the response time of the governor. It is to be understood that the above problems also exist when the governor response time is to be tested for a final speed which is lower than the initial speed.

Also, it is noted that due to the difficulty of accurately aligning the parallel shafts of test stand drive and fuel pump, undesirable side loading of the shaft bearing may occur. Thus, there is a need to relieve this loading by accommodating shaft misalignment.

The present invention is directed to overcoming one or more of the problems as set forth above.

DISCLOSURE OF INVENTION

In one aspect of this invention, a test stand has a drive shaft and the improvements comprise an inertial weight operatively associated with the drive shaft and means for selectively engaging and disengaging the inertial weight from the drive shaft.

For constant speed tests of the injection fuel pump, the inertial weight can be engaged with the drive shaft to insure that only small design value changes occur in the drive shaft speed during the jerk loading placed on the drive shaft by the operation of the injection fuel pump. In order to check the governor response time, the inertial weight is selectively disengaged from the drive shaft and the drive shaft is rapidly accelerated or decelerated to a final desired speed without the necessity of overcoming the inertia of said inertial weight. Thus, the governor response characteristics can be accurately measured without any transient effects introduced into the results due to the inability of the drive shaft to rapidly change to the desired speed.

In another aspect of the invention, spline means are provided which allow the cam shaft of the fuel pump to be driven when the flywheel is disengaged, and yet allow for shaft misalignment.

BEST MODE FOR CARRYING OUT THE INVENTION

Figure 1:
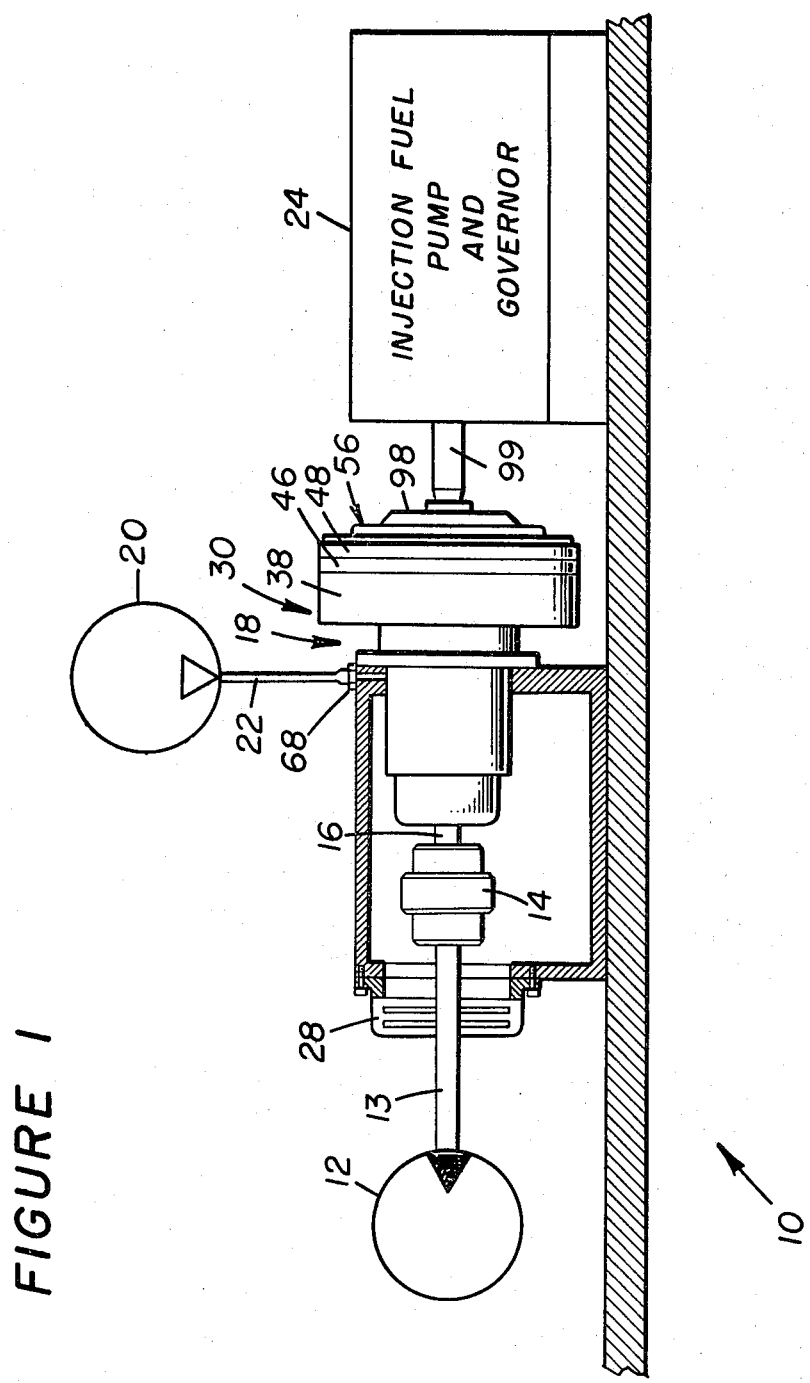
FIG. 1 depicts a schematic layout of an embodiment of the test stand of the invention, and also the fuel pump and governor arrangement being tested.

With reference to the figures, and in particular to FIG. 1, a test stand is depicted and generally denoted by the numeral 10. The test stand 10 includes a hydraulic motor 12 having an output shaft 13 which is coupled through a spline coupling 14 to a drive shaft 16 of a drive assembly 18. A source of pneumatic pressure 20 is placed in communication with the drive assembly 18 by a conduit 22. Also shown in FIG. 1 is the injection fuel pump and governor arrangement 24 to be tested. The arrangement 24 is coupled to the drive shaft 16 of the drive assembly 18, as will be described hereinbelow.

Figure 2:
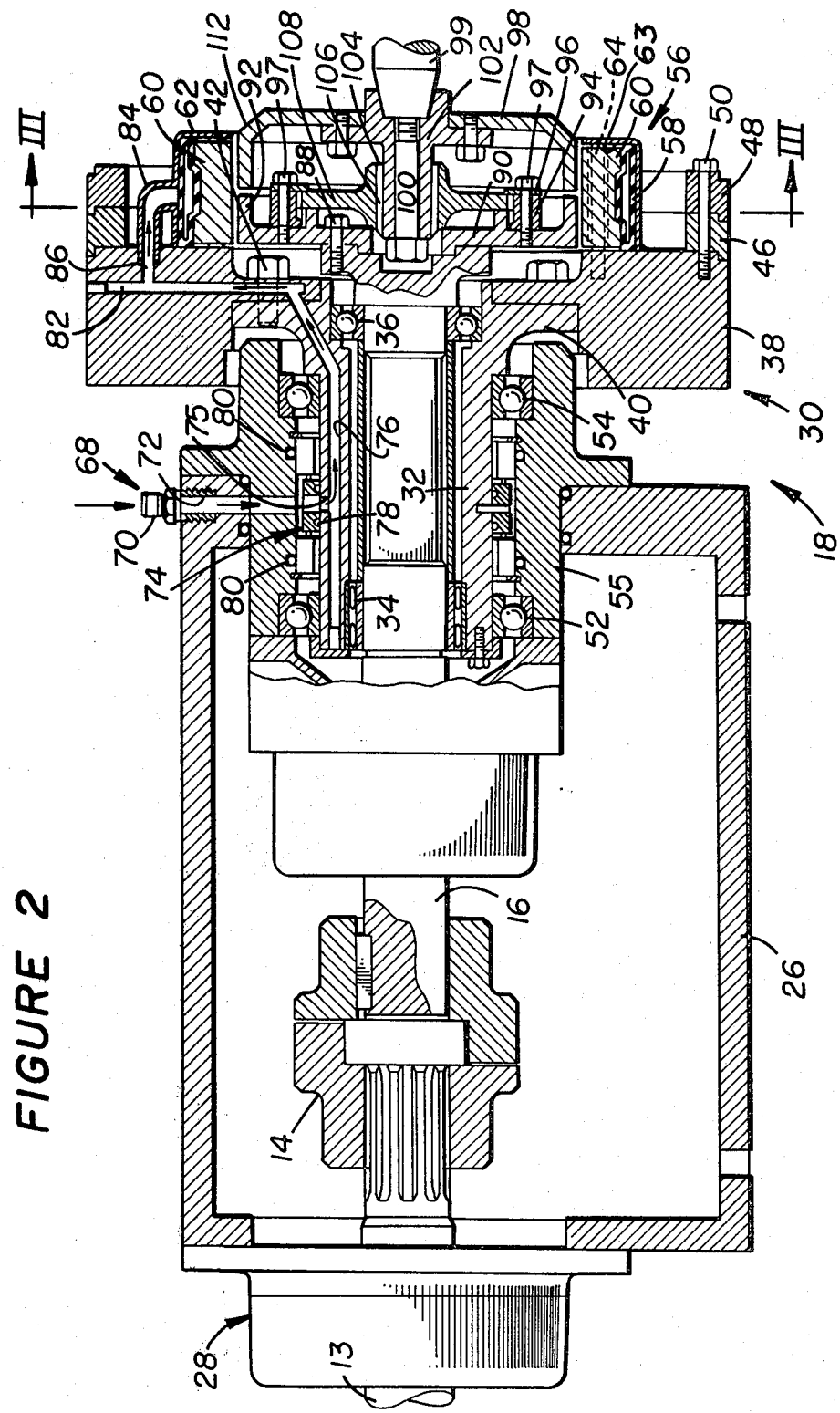
FIG. 2 depicts an enlarged, partially sectioned side elevational view of the drive assembly of the test stand of FIG. 1.
Figure 2A:
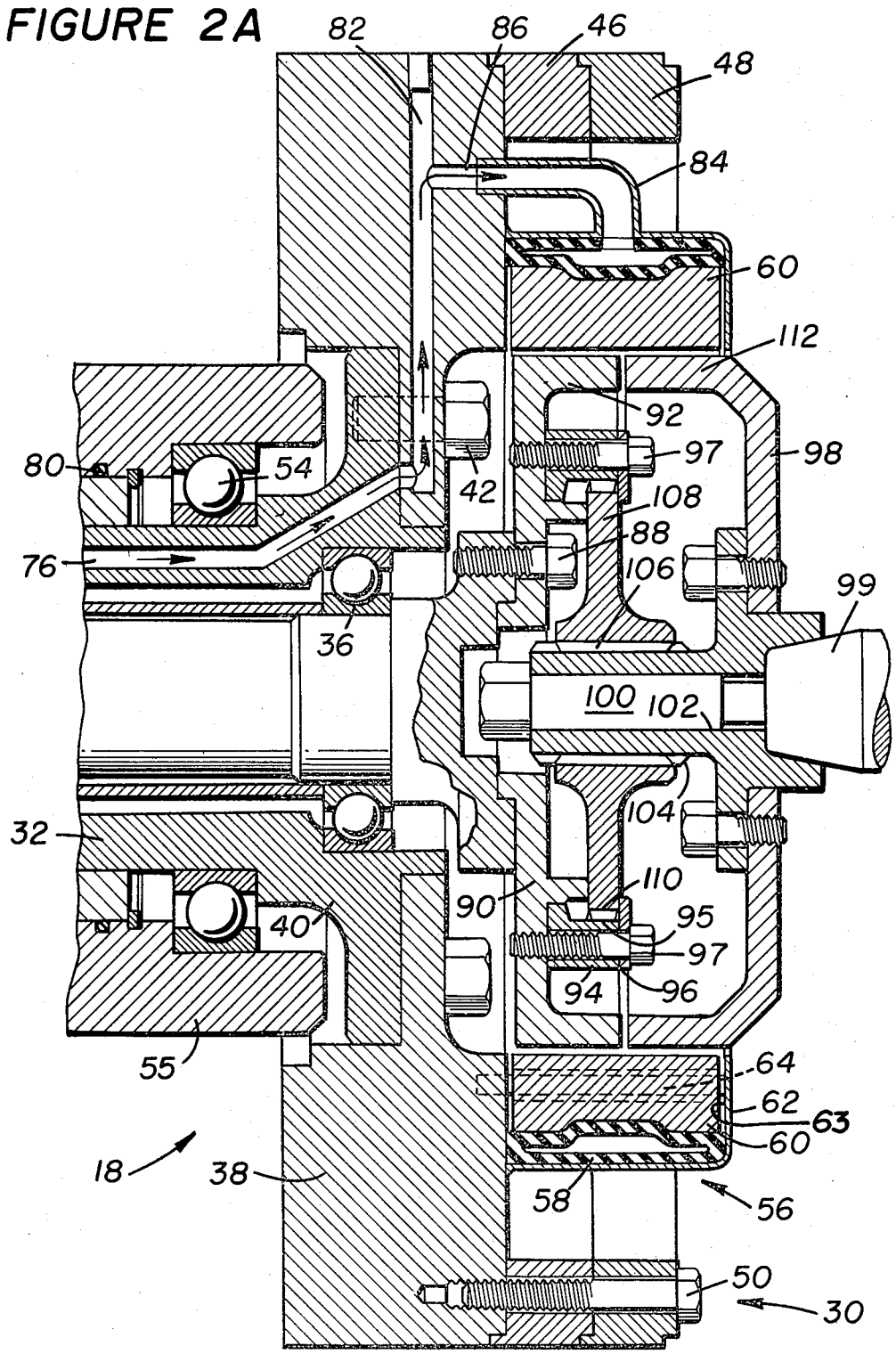
FIG. 2A is an enlargement of a portion of FIG. 2.

Turning to FIGS. 2 and 2A, a partially sectioned side elevational view of the drive assembly 18 is depicted. Assembly 18 includes an outer housing 26 which is located about the drive shaft 16. Operatively associated with drive shaft 16 of the drive assembly 18 is a conventional shaft encoder 28. Said encoder can very accurately determine the rotational position and speed of the drive shaft 16.

Mounted about drive shaft 16 is an inertial weight assembly 30, which can increase the inertia of drive shaft 16. Inertial weight assembly 30 includes a sleeve 32 which is rotatively mounted to drive shaft 16 by, in a preferred embodiment, oil lubricated bearings 34 and 36. The axis of rotation of sleeve 32 is colinear with that of shaft 16. Inertial weight assembly 30 further includes inertial weight 38 which essentially comprises an annulus which is positioned about drive shaft 16 and secured to a radial flange 40 of inertia sleeve 32 by a plurality of bolts, such as bolt 42. As can be seen in FIG. 2, inertial weight 38 can have a plurality of annular plates secured thereto, as for example annular plates 46 and 48, by a plurality of bolts, such as bolts 50. Thus, the weight of the inertial weight assembly 30 can be varied according to the number of annular plates which are affixed thereto.

Inertial weight assembly 30 is supported by and mounted for rotation relative to housing 26 by, for example, oil lubricated ball bearings 52 and 54 which are secured to sleeve 32, and a generally cylindrical flanged casing 55. The casing 55 is releasably connected to the housing 26 and extends partially into the housing.

Figure 3:
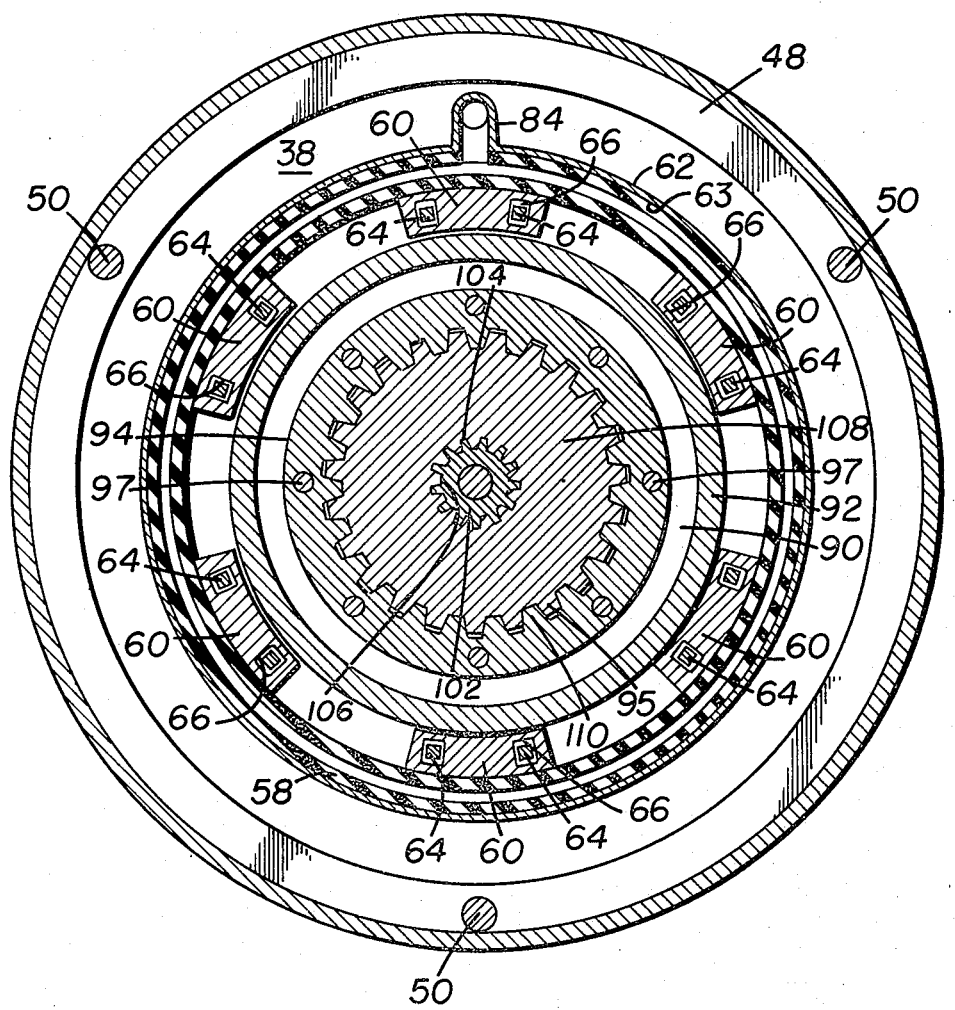
FIG. 3 depicts a cross-sectional view taken through line III—III of FIG. 2.

Secured to inertial weight 38 is a bellows assembly or clutch 56. Bellows assembly 56 includes, in a preferred embodiment, an air actuable annular bellows or bladder diaphragm 58 which can be made of an elastomeric material. Bellows 58 is generally D-shaped in cross-section and, when inflated, a portion thereof moves radially inwardly. Bellows assembly 56 further includes a plurality of friction pads 60 (FIGS. 2, 2A, and 3) which are secured to bellows 58 and which can move radially inwardly with bellows 58. Friction pads 60 are contained in an annular channel 63 defined on one side by the inertial weight 38, and on the other side by an annular flange 62. Further, the movement of each friction pad 60 is restrained by one or more pins 64 which are secured at one end to annular flange 62, and at the other end to inertial weight 38. Pins 64 have a square cross-section, as is illustrated in FIG. 3, and are disposed in radially elongated slots 66 defined by pads 60, which slots allow the pads to move inwardly as the bellows become inflated. Further, within the limitations of the above-described channel and the radial slots 66, the friction pads can rock from side to side to compensate for possible shaft misalignment, which will be described hereinbelow.

A conduit arrangement 68 (FIG. 2) is defined by drive assembly 18 for selectively supplying air pressure to bellows assembly 56. Conduit arrangement 68 includes a pressure fitting 70 which is secured to housing 26 and to which conduit 22 (FIG. 1) from pneumatic source 20 can be connected. A conduit 72 extends from fitting 70 through casing 55 and communicates with air bearing arrangement 74. Air bearing arrangement 74 is of the type well known in the art and is positioned between casing 55 and inertial weight sleeve 32, and also between the ball bearings 52 and 54 (FIGS. 2 and 2A). As can be appreciated, air bearing arrangement 74 includes a number of O-rings, such as O-rings 78 and 80, for purposes of providing a sealing arrangement between said sleeve 32 and housing 26. Air bearing arrangement 74 communicates with a bore 75 which is provided in sleeve 32 and oriented perpendicularly to the axis of rotation of sleeve 32. Bore 75 communicates with a passage 76 which is bored through inertial weight sleeve 32. Passage 82 is bored into inertial weight 38 and communicates at one end thereof with passage 76 adjacent the radial flange 40. An elbow conduit 84 provides communication between the bellows 58 and a passage 86 which is defined by inertial weight 38 and is provided in flow communication with passage 82.

Secured to drive shaft 16 by a plurality of bolts, such as bolt 88, is a drive drum 90 (see FIGS. 2, 2A and 3). Drum 90 includes a peripheral flange 92. It is noted that peripheral flange 92 is positioned immediately adjacent the radially inner surfaces of the radially disposed friction pads 60 of bellows assembly 56. An annular member 94 having inwardly directed spline teeth 95 is located inside flange 92 and a retaining ring 96 is positioned adjacent teeth 95. Bolts 97 (FIG. 2A) secure annular member and retaining ring 96 to drum 90.

A plain rim drive drum or fuel injection pump drum 96 (see FIGS. 2A and 3) is secured to a cam shaft 99 of the fuel pump and governor arrangement 24 by a bolt 100 which is disposed in a bore provided through an extended hub 102 of fuel injection pump drum 98. The outer peripheral surface of said extended hub defines outwardly directed spline teeth 104 which are selectively engagable with inwardly directed spline teeth 106 of a gear 108. As can be seen in FIG. 2A, gear 108 also defines outwardly directed spline teeth 110, which can engage spline teeth 95. Note that retaining ring 96 retains gear 108 so that spline teeth 95 and 110 are held in an intermeshing relationship.

The fit between spline teeth 95 and 110, and between teeth 104 and 106 is loose enough to allow up to a 0.127 mm (0.005 in.) misalignment between drive shaft 16 and cam shaft 99. Even larger misalignments can be tolerated with looser fitting spline teeth. Accordingly, less than all of the spline teeth 95 and 110, and less than all of the spline teeth 104 and 106 are in engagement, as the drive shaft 16 turns the cam shaft 99. Thus, the cam shaft 99 is free floating with respect to the drive shaft.

Fuel pump drum 98 (FIG. 2A) further includes a peripheral flange 112 which has substantially the same diameter as the peripheral flange 92 of drum 90. Further, peripheral flange 112 is located immediately adjacent the radially inner surfaces of friction pads 60 of bellows assembly 56.

INDUSTRIAL APPLICABILITY

The operation of test stand 10 is as follows. The fuel pump drum 98 is secured to the cam shaft 99 of the fuel pump as described hereinabove. Then, the spline 104 of the fuel pump drum 98 is inserted into the spline 106 of gear 108, gear 108 having already been secured to drive pulley 90 as described above. Air pressure is provided from source 20 to conduit arrangement 68 and from there to the bellows assembly 56 to extend the bellows 58 and force the friction pads 60 into engagement with the peripheral flanges 92 and 112 of the drums 90 and 98 to selectively engage the inertial weight assembly 30 to the drive shaft 16 and cam shaft 99. It is to be understood that any misalignment of the cam shaft with respect to the drive shaft will cause a misalignment of the flanges of the two drums. Such drum misalignment can be accommodated due to the ability of the friction pads to rock about pins 64. Further, the loose fit between spline teeth 95 and 110, and between teeth 104 and 106, also aids in accommodating the aforementioned misalignment. It is to be understood, however, that with the friction pads engaging, and rigidly fixing the drums with respect to each other, the cam shaft 99 is driven through the friction pads only and not through the splines. The cam shaft is driven through the splines only when the friction pads are retracted out of engagement with said drums, in which condition the flywheel becomes inactive.

With the inertial weight assembly 30 selectively secured to the drive shaft 16, the hydraulic motor 12 can be energized to bring the driveshaft and the fuel pump and governor 24 up to a selected speed and to maintain that selected speed. With the injection fuel pump maintained at a selected test speed, the fuel pump can be calibrated and tested to insure that it delivers the appropriate amount of fuel at the appropriate timed intervals. It is to be understood that even though the injection fuel pump is a jerk load device, as described hereinabove, the inertial weight assembly of the invention, in a preferred embodiment, can deliver stored energy to maintain a constant speed of revolution of the drive shaft to within 3 rpm or less of the desired speed. Thus, the problem of the rpm varying as much as 80 rpm when the pump injects fuel is eliminated.

For governor response testing, the pneumatic pressure in the bellows assembly 56 is vented to atmosphere and the friction pads 60 automatically retract from the drums 90,98, while the drive shaft 16 is turning, so that the inertial weight 38 can spin independently of the drive shaft. With the mass of the inertia weight disengaged from the drive shaft, the drive shaft can be rapidly accelerated or decelerated by the motor 12 to a final speed without having to accelerate or decelerate the inertial weight. Thus, the acceleration or deceleration to the final speed can be quite rapid, so that the true response of the governor associated with the fuel pump can be accurately tested. The inability of former test stands to control speed accurately or to be capable of rapid speed changes is hereby overcome.

It is to be understood that additional weights can be added to the inertial weight assembly to increase the stability of the test stand speed.

Other aspects, objects and advantages of this invention can be obtained from a study of the drawings, the disclosure, and the appended claims.

I claim:

1. In a test stand (10) which has a drive shaft (16), the improvement comprising:
an inertial weight (30);
bearing means (34,36,52,54,55,26) for rotatively mounting said inertial weight (30) about said drive shaft (16); and
means (56) for at least selectively disengaging the inertial weight (30) from the drive shaft (16) while said drive shaft (16) is turning wherein said means (56) includes a bellows (58), located about said drive shaft (16), and a plurality of drive shaft engaging members (60) connected to said bellows (58).

2. The test stand (10) of claim 1 wherein said bellows (58) is secured to said inertial weight (30).

3. The test stand (10) of claim 1 including means (46,48,50) for selectively increasing and decreasing the weight of said inertial weight (30).

4. The test stand (10) of claim 1 including a driven shaft (99), a first drum (90) secured to said drive shaft (16), a second drum (98) secured to said driven shaft (99), and wherein said drive shaft engaging members (60) include a plurality of friction pads positioned at least partially circumferentially about said drums (90,98).

5. The test stand (10) of claim 1 including a driven shaft (99), the drive shaft (16) and driven shaft (99) having first and second splines (95,104) respectively, and spline means (108) for connecting the first spline (95) to the second spline (104), said spline means (108) having third (110) and fourth splines (106), said third spline (110) being selectively engageable with said first spline (95) and said fourth spline (106) being selectively engageable with said second spline (104).

6. The test stand (10) of claim 5 including means (96) for retaining said third spline (110) in engagement with said first spline (95).

7. A test stand (10) comprising:
a support (26,55);
an inertial weight (30) rotatably connected to the support (26,55);
a drive shaft (16) rotatably extending through the inertial weight (30); and
means (56) for selectively connecting the inertial weight (30) to the drive shaft (16) for joint rotation and more uniform speed control, and for disconnecting the inertial weight (30) from the drive shaft (16) for independent rotation and more rapid acceleration and deceleration of the drive shaft (16), said means (56) including an inflatable bellows (58) and pad means (60) for radially connecting said inertial weight (30) to said drive shaft (16).

8. The test stand (10) of claim 7 for testing an injection fuel pump and governor (24), and including coupling means (94,102,108) adapted for misalignably connecting the injection fuel pump and governor (24) to said drive shaft (16).

* * * * *